United States Patent
Ikeno et al.

(10) Patent No.: US 6,780,919 B2
(45) Date of Patent: Aug. 24, 2004

(54) ORGANOPOLYSILOXANE COMPOSITION FOR MOLDING

(75) Inventors: Masayuki Ikeno, Maebashi (JP); Masaya Arakawa, Annaka (JP); Kouichi Tanaka, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 236 days.

(21) Appl. No.: 10/020,219

(22) Filed: Dec. 18, 2001

(65) Prior Publication Data

US 2002/0111452 A1 Aug. 15, 2002

(30) Foreign Application Priority Data

Dec. 18, 2000 (JP) ........................................ 2000-384154

(51) Int. Cl.$^7$ .......................... C08L 83/05; C08L 83/07; C08K 3/36
(52) U.S. Cl. ........................ 524/493; 524/267; 524/268; 524/588; 525/478
(58) Field of Search ................................ 524/493, 267, 524/268, 588; 528/15, 31, 32; 525/478

(56) References Cited

U.S. PATENT DOCUMENTS

| | | | | |
|---|---|---|---|---|
| 4,032,502 A | * | 6/1977 | Lee et al. | 523/212 |
| 4,100,627 A | * | 7/1978 | Brill, III | 623/8 |
| 4,529,789 A | * | 7/1985 | Kroupa | 528/15 |
| 4,535,141 A | * | 8/1985 | Kroupa | 528/15 |
| 4,701,017 A | * | 10/1987 | Kookootsedes et al. | 385/141 |
| 4,845,164 A | * | 7/1989 | Gutek | 528/15 |
| 5,288,795 A | | 2/1994 | Fujiki et al. | |
| 5,371,163 A | * | 12/1994 | Wilson | 528/15 |
| 5,679,734 A | * | 10/1997 | Peccoux et al. | 524/267 |
| 6,251,327 B1 | | 6/2001 | Bentz et al. | |
| 6,545,076 B2 | * | 4/2003 | Kaiya et al. | 524/268 |

FOREIGN PATENT DOCUMENTS

| | | |
|---|---|---|
| EP | 0 905 196 A2 | 3/1999 |
| JP | 5-279571 | 10/1993 |

* cited by examiner

Primary Examiner—Jeffrey B. Robertson
(74) Attorney, Agent, or Firm—Oblon, Spivak, McClelland, Maier & Neustadt, P.C.

(57) ABSTRACT

An organopolysiloxane composition for molding purposes is provided which includes: (A) an organopolysiloxane with at least two alkenyl groups bonded to silicon atoms, (B) a straight chain organopolysiloxane with a hydrogen atom bonded to a silicon atom at both terminals, (C) an organohydrogenpolysiloxane with at least three hydrogen atoms bonded to silicon atoms within a single molecule and including a RHSiO unit and a $R_2XSiO_{1/2}$ unit (wherein R is an unsubstituted or a substituted monovalent hydrocarbon group with no alkenyl groups, and X represents either a hydrogen atom or a group represented by R as defined above) within the molecule, (D) a hydrosilylation reaction catalyst, and (E) finely powdered silica, wherein the total number of hydrogen atoms bonded to silicon atoms within the constituent (B) and the constituent (C) ranges from 1 to 5 per alkenyl group within the constituent (A), and the number of hydrogen atoms bonded to silicon atoms within the constituent (B) accounts for 20 to 70 mol % of the combined number of hydrogen atoms bonded to silicon atoms within the constituent (B) and the constituent (C). This composition displays superior mold releasability relative to materials such as urethane resins, epoxy resins, dicyclopentadiene resins and polyester resins, and moreover also displays superior elongation at shearing and tear strength, and can be suitably used as a highly durable mold composition.

9 Claims, No Drawings

ORGANOPOLYSILOXANE COMPOSITION FOR MOLDING

BACKGROUND OF THE INVENTION

1. Field of the Invention

The present invention relates to an organopolysiloxane composition for molding purposes used for producing a molding matrix, which upon curing displays superior mold releasability relative to casting resin materials such as urethane resins, epoxy resins, dicyclopentadiene resins and polyester resins.

2. Description of the Prior Art

The production from an original mold of a silicone rubber matrix from an organopolysiloxane composition, and the subsequent injection of a material such as a urethane resin, an epoxy resin, a dicyclopentadiene resin or a polyester resin into this matrix to form a resin molded replica product is a well-known technique. In recent years, resin molded products produced in this manner have been supplied for use in automobile components and household electrical components, and the characteristics of such resin molded products are being given serious consideration. As a result, the improvements in the characteristics of the casting resins have been quite dramatic, although unfortunately these improvements have resulted in a deterioration in the durability of the silicone rubber matrix, and the number of replica products that can be produced from a single matrix has decreased. Consequently, improvements in durability of the mold releasability (hereinafter, "mold release durability") or mold durability of the silicone rubber matrix with respect to these resins have been keenly sought.

An improvement in mold release durability upon addition of an alkali metal hydroxide to a silicone composition is disclosed in (Japanese) Laid-open publication (kokai) No. 4-216864 corresponding to U.S. Pat. No. 5,288,795, whereas in (Japanese) Laid-open publication No. 5-279571, an improvement in mold releasability is disclosed for compositions incorporating a compound selected from the group consisting of an organotin compound, an organotitanium compound and an imidazole derivative. A technique for improving polyester mold durability using a radical scavenger is disclosed in (Japanese) Laid-open publication No. 11-158385 corresponding to U.S. Pat. No. 6,251,327 and EP 0 905 196 A2. However, even with these modifications, the mold durability is still not entirely satisfactory. A composition using a polyfunctional cross-linking agent and a difunctional cross-linking agent is also disclosed in (Japanese) Laid-open publication No. 11-158385. However, the proportion of the difunctional cross-linking agent within the combined total of the cross-linking agents cannot be ascertained from the content of the above publication, and there is no indication that a combination of polyfunctional and difunctional chain extending agents produces superior mold release durability.

SUMMARY OF THE INVENTION

An object of the present invention is to provide an organopolysiloxane composition for molding purposes which displays superior mold releasability relative to materials such as urethane resins, epoxy resins, dicyclopentadiene resins and polyester resins.

The inventors of the present invention discovered that by combining a polyfunctional cross-linking agent and a difunctional cross-linking agent as a chain lengthening agent within an organopolysiloxane composition, and moreover by ensuring that the number of SiH groups within the difunctional cross-linking agent accounted for 20 to 70 mol % of the total number of SiH groups within the combined cross-linking agent, a composition could be produced which conformed to the above object, and as a result were able to complete the present invention.

In other words, the present invention provides an organopolysiloxane composition for molding purposes comprising (A) an organopolysiloxane with at least two alkenyl groups bonded to silicon atoms in a single molecule, having a viscosity at 25° C. of 0.05 to 100 Pa·s, (B) a straight chain organopolysiloxane with a hydrogen atom bonded to a silicon atom at both terminals and with no aliphatic unsaturated bonds within the molecule, having a viscosity at 25° C. of 0.001 to 1.0 Pa·s, (C) an organohydrogenpolysiloxane with at least three hydrogen atoms bonded to silicon atoms within a single molecule and comprising a RHSiO unit and a $R_2XSiO_{1/2}$ unit (wherein R is an unsubstituted or a substituted monovalent hydrocarbon group with no alkenyl groups, and X represents a hydrogen atom or a group represented by R as defined above) within the molecule as essential components, having a viscosity at 25° C. of 0.001 to 1.0 Pa·s, (D) an effective quantity of a hydrosilylation reaction catalyst, (E) no more than 50 parts by weight of a finely powdered silica with a specific surface area of at least 50 $m^2/g$ per 100 parts by weight of the constituent (A), and (F) 0 to 20 parts by weight of a non-functional organopolysiloxane having a viscosity at 25° C. of 0.01 to 500 Pa·s per 100 parts by weight of the constituent (A), wherein the total number of hydrogen atoms bonded to silicon atoms within the aforementioned constituent (B) and constituent (C) is in a range of 1 to 5 atoms per alkenyl group within the aforementioned constituent (A), and the number of hydrogen atoms bonded to silicon atoms within the constituent (B) accounts for 20 to 70 mol % of the combined number of hydrogen atoms bonded to silicon atoms within the constituent (B) and the constituent (C).

An organopolysiloxane composition for molding purposes according to the present invention displays superior mold releasability relative to materials such as urethane resins, epoxy resins, dicyclopentadiene resins and polyester resins, and moreover also displays superior elongation at shearing and tear strength and can be suitably used as a highly durable mold composition.

DETAILED DESCRIPTION OF THE PREFERRED EMBODIMENTS

The present invention is now described in more detail.

[Constituent (A)]

In the present invention, constituent (A) is an organopolysiloxane with at least two alkenyl groups bonded to silicon atoms in a single molecule. Specific examples of the alkenyl groups within the constituent (A) include vinyl groups, allyl groups, propenyl groups, isopropenyl groups, butenyl groups, isobutenyl groups, pentenyl groups, hexenyl groups and heptenyl groups, although vinyl groups are preferred. There are no particular restrictions on the bonding position of the alkenyl groups within the constituent (A), and molecular chain terminals and/or molecular side chains are suitable. Furthermore, examples of organic groups other than the alkenyl groups which may be bonded to the silicon atoms of the constituent (A) typically include unsubstituted or substituted monovalent hydrocarbon groups of 1 to 10 carbon atoms, and preferably of 1 to 8 carbon atoms, with specific examples including alkyl groups such as methyl groups, ethyl groups, propyl groups, butyl groups, pentyl groups and hexyl groups; cycloalkyl groups such as cyclopentyl groups and cyclohexyl groups; aryl groups such as phenyl groups, tolyl groups, xylyl groups, and naphthyl groups; aralkyl groups such as benzyl groups and phenethyl groups; and halogen substituted alkyl groups such as 3,3,3-trifluoropropyl groups and 3-chloropropyl groups, although in terms of ease of synthesis, methyl groups are preferable.

The viscosity at 25° C. of the constituent (A) can be chosen from within a range from 0.05 to 100 Pa·s, with values from 0.1 to 30 Pa·s being preferable. The siloxane skeleton of the organopolysiloxane of the constituent (A) may be either a straight chain or a branched chain, or a mixture of the two, although a substantially straight chain diorganopolysiloxane in which the backbone chain comprises repeating diorganosiloxane units and both terminals of the molecular chain are blocked with a triorganosiloxy group are preferable.

[Constituent (B)]

The constituent (B) used in the present invention is a straight chain organopolysiloxane having two SiH groups within the molecule, with a hydrogen atom bonded to a silicon atom at both terminals of the molecular chain (namely, SiH groups), and with no aliphatic unsaturated bonds within the molecule. The viscosity at 25° C. of the constituent (B) is within a range from 0.001 to 1.0 Pa·s, with values from 0.01 to 0.1 Pa·s being preferable. This straight chain organopolysiloxane functions so as to increase the molecular chain length of the aforementioned constituent (A) during the curing process, and has a significant effect on the molding durability.

An example of this organopolysiloxane can be represented by a general formula (I) shown below.

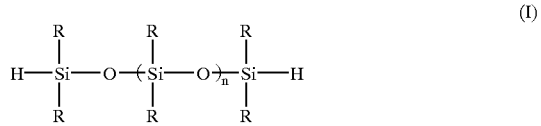

wherein, R is an unsubstituted or substituted monovalent hydrocarbon group with no alkenyl groups, and n is a number such that a viscosity at 25° C. for the organopolysiloxane which falls within the range described above.

In the general formula (I), R represents an unsubstituted or substituted monovalent hydrocarbon group which incorporates no alkenyl groups, and is typically of 1 to 10 carbon atoms, and preferably of 1 to 8 carbon atoms, with specific examples including alkyl groups such as methyl groups, ethyl groups, propyl groups, butyl groups, pentyl groups and hexyl groups; cycloalkyl groups such as cyclopentyl groups and cyclohexyl groups; aryl groups such as phenyl groups, tolyl groups, xylyl groups, and naphthyl groups; aralkyl groups such as benzyl groups and phenethyl groups; and halogen substituted alkyl groups such as 3,3,3-trifluoropropyl groups and 3-chloropropyl groups. n is a number which produces a viscosity at 25° C. for this organopolysiloxane which falls within the aforementioned range from 0.001 to 1.0 Pa·s, and preferably within a range from 0.01 to 0.1 Pa·s.

[Constituent (C)]

In the present invention, constituent (C) is an organohydrogenpolysiloxane with at least three hydrogen atoms bonded to silicon atoms (SiH groups) within a single molecule. The hydrogen atoms bonded to silicon atoms may be positioned on terminal siloxane units and on siloxane units positioned within the polymer chain, or may be positioned only within the siloxane chain. This organohydrogenpolysiloxane is a straight chain siloxane polymer, incorporating units of RHSiO groups and $R_2XSiO_{1/2}$ groups within the molecule as essential units, and may optionally incorporate units of $R_2SiO$ groups. Specific examples are presented below.

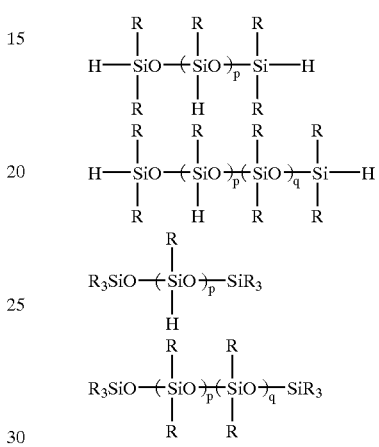

wherein, R represents the same meaning as described above, p and q each represent an integer of 1 or greater, and p or p+q are values which satisfy the aforementioned viscosity range.

In these formulas, R represents the same meaning as described for the general formula (I), namely, an unsubstituted or substituted monovalent hydrocarbon group which incorporates no alkenyl groups, and is typically of 1 to 10 carbon atoms, and preferably of 1 to 8 carbon atoms, and X represents either H or a group represented by R as described above. The viscosity at 25° C. of the organohydrogenpolysiloxane of the constituent (C) is within a range from 0.001 to 1.0 Pa·s, with values from 0.01 to 0.1 Pa·s being preferred.

The total number of hydrogen atoms bonded to silicon atoms (namely, SiH groups) within the aforementioned constituent (B) and constituent (C) is in a range of 1 to 5 atoms, and preferably 1 to 3 atoms, per alkenyl group within the aforementioned constituent (A). Furthermore, the number of hydrogen atoms bonded to silicon atoms within the constituent (B) accounts for 20 to 70 mol %, and preferably 30 to 60 mol %, of the total number of hydrogen atoms bonded to silicon atoms within the combined constituent (B) and the constituent (C).

[Constituent (D)]

In the present invention, the hydrosilylation reaction catalyst of the constituent (D) may be any catalyst which promotes the addition reaction (hydrosilylation) between the alkenyl groups of the constituent (A) and the SiH groups within the constituent (B) and the constituent (C), and any of the catalysts commonly used for such purposes can be used. For example, at least one catalyst selected from the group consisting of platinum based catalysts, palladium-based catalyst based catalysts and rhodium based catalysts may be used, and specific examples include chloroplatinic acid, alcohol modified products of chloroplatinic acid, coordination compounds of chloroplatinic acid with olefins, vinyl siloxanes or acetylene compounds, tetrakis (triphenylphosphine) palladium and chlorotris (triphenylphosphine) rhodium, although platinum based compounds are particularly desirable. The constituent (D) should be used in quantities which offer effective catalytic action (so-called catalytic quantity), so that for example, the quantity of the catalyst (in terms of the weight of the metallic element) should be 0.01 to 500 ppm, and preferably 0.1 to 100 ppm, relative to the combined weight of the constituent (A), the constituent (B) and the constituent (C).

[Constituent (E)]

In the present invention, the finely powdered silica of the constituent (E) functions as a reinforcing agent. A composition of the present invention is particularly suited for use as a mold material, and the cured product is formed into a matrix which may be any one of a variety of different shapes. Consequently, the cured product may be formed into a reverse taper shaped matrix, in which case the strength characteristics of the matrix, and particularly the tear strength, are important, and by using finely powdered silica as a reinforcing agent in compositions of the present invention, it becomes possible to form cured products capable of satisfying these types of strength requirements. The finely powdered silica must have a specific surface area of at least 50 $m^2/g$, as measured by BET methods, with values of 100 to 300 $m^2/g$ being preferred. At specific surface area values less than 50 $m^2/g$, satisfactory strength characteristics cannot be obtained.

Examples of this type of finely powdered silica, which display a specific surface area within the aforementioned range, include synthetic silica, e.g., dry process silica such as fumed silica and wet process silica. These types of silica have a large number of silanol groups on the surface, and so may also be used as so-called treated silica, where the surface is treated with a material such as a halogenated silane, an alkoxy silane or a silazane compound. Furthermore, the amount of this finely powdered silica incorporated into the composition should be no more than 50 parts by weight per 100 parts by weight of the organopolysiloxane of the constituent (A), with quantities of 10 to 40 parts by weight being preferred, and with the actual amount being selected from within this range so as to achieve an appropriate degree of strength. If the amount of this silica exceeds 50 parts by weight per 100 parts by weight of the constituent (A), then the workability of the composition deteriorates.

[Constituent (F)]

In the present invention the constituent (F) is optionally used where necessary as an internal mold releasing agent for the composition, and should preferably comprise a straight chain non-functional organopolysiloxane. If this organopolysiloxane were to have functional groups capable of undergoing addition reactions such as alkenyl groups or hydrosilyl groups (SiH groups), then it would become immobilized within the cured rubber, and provide no effect in reducing the release force. Consequently, examples of suitable substituent groups for bonding to the silicon atoms of this non-functional organopolysiloxane include alkyl groups such as methyl groups, ethyl groups and propyl groups, aryl groups such as phenyl groups and tolyl groups, and halo-substituted alkyl groups such as 3,3,3-trifluoropropyl groups and 3-chloropropyl groups. The viscosity at 25° C. of the non-functional organopolysiloxane is within a range from 0.01 to 500 Pa·s, with values of 0.03 to 100 Pa·s being preferred. The amount of this constituent incorporated into the composition should be from 0 to 20 parts by weight, and preferably 5 to 10 parts by weight, per 100 parts by weight of the constituent (A). If the amount of the constituent (F) exceeds 20 parts by weight per 100 parts by weight of the constituent (A), then oil bleeding becomes a problem, and the transference of silicone to the resin replica products becomes increasingly likely.

[Other Constituents]

In a composition of the present invention, in addition to the constituents described above, other known extenders may also be added, provided the objects of the present invention in improving the mold release durability are not impaired. Examples of such extenders include organopolysiloxane resins incorporating $SiO_2$ units or $R^1SiO_{3/2}$ units and with at least two alkenyl groups in a single molecule. Furthermore, reaction retarding agents may also be used, and any of the conventional addition reaction retarding agents may be used, including acetylene based compounds such as 3-methyl-1-butyn-3-ol, 3,5-dimethyl-1-hexyn-3-ol and phenylbutynol; alkenylsiloxanes such as 1,3,5,7-tetramethyl-1,3,5,7-tetravinylcyclotetrasiloxane and 1,3-divinyltetramethyldisolxane; triazole compounds such as benzotriazole; as well as other phosphine compounds and mercapto compounds, any of which can be added in small or minute quantities. In addition, other additives including inorganic pigments such as cobalt blue; coloring agents such as organic dyes; and additives for improving the heat resistance and fire resistance such as cerium oxide, zinc carbonate, manganese carbonate, red iron oxide, titanium oxide and carbon black may also be added.

EXAMPLES

As follows is a more detailed description of the present invention using a series of examples, although the present invention is in no way limited to the examples presented.

Example 1

A mixture of: (a) 35 parts by weight of a dimethylpolysiloxane with both terminals of the molecular chain blocked by a vinyldimethylsilyl group and having a viscosity at 25° C. of approximately 1 Pa·s, (a') 30 parts by weight of a dimethylpolysiloxane with both terminals of the molecular chain blocked by a vinyldimethylsilyl group and having a viscosity at 25° C. of approximately 0.4 Pa·s, 20 parts by weight of hydrophobic silica with a specific surface area of 120 $m^2/g$ which had been treated with trimethylsilyl groups, and 25 parts by weight of powdered quartz with an average particle diameter of 5 μm was placed in a kneader, and with the mixture undergoing constant stirring, 5 parts by weight of hexamethyldisilazane and 2.5 parts by weight of water were added, and the resulting mixture was then stirred for 1 hour without heating. The temperature was then raised to 150° C., and the mixing continued for a further 2 hours, before the temperature was once again cooled to room temperature. To 100 parts by weight of the thus obtained mixture were added: (b) 4.0 parts by weight of a dimethylpolysiloxane with a hydrogen atom bonded to a silicon atom (SiH group) at both terminals of the molecular chain (wherein the proportion of silicon atom bonded hydrogen atoms=0.13 weight %) and having a viscosity at 25° C. of 0.018 Pa·s, (c) 2.3 parts by weight of a methylhydrogenpolysiloxane with hydrogen atoms bonded to silicon atoms on side chains of the molecular chain (wherein the proportion of silicon atom bonded hydrogen atoms=0.38 weight %) and having a viscosity at 25° C. of 0.015 Pa·s, 4 parts by weight of a dimethylpolysiloxane with both terminals of the molecular chain blocked with a trimethylsilyl group and having a viscosity at 25° C. of approximately 100 Pa·s, sufficient quantity of a complex of chloroplatinic acid and divinyltetramethyldisiloxane to provide 30 ppm of platinum metal relative to the combined quantity of the aforementioned constituents (a), (a'), (b) and (c), and 0.1 parts by weight of 1,3,5,7-tetramethyl-1,3,5,7-tetravinylcyclotetrasiloxane as a retarding agent, and following careful stirring of the mixture, the mixture was degassed under vacuum to complete the production of the composition. This composition was then cured for 2 hours at 60° C., and used to prepare a sheet in accordance with JIS K 6249, and the general properties of the sheet were then measured.

A concave shaped matrix was also formed by curing a sample of the above composition under the same conditions. A urethane resin (3017 manufactured by H & K Corporation) was then poured into this concave shaped mold, and molding carried out by curing the urethane resin over a one hour period at 70° C. This molding operation was repeated until the urethane resin adhered to the silicone mold, and the mold durability was evaluated based on the number of such molding operations performed. The general properties, and the results of the mold durability evaluation are shown in Table 1.

Example 2

A mixture of: (a) 65 parts by weight of a dimethylpolysiloxane with both terminals of the molecular chain blocked by a vinyldimethylsilyl group and having a viscosity at 25° C. of approximately 1 Pa·s, 20 parts by weight of hydrophobic silica with a specific surface area of 120 m²/g which had been treated with trimethylsilyl groups, and 35 parts by weight of powdered quartz with an average particle diameter of 5 μm was placed in a kneader, and with the mixture undergoing constant stirring, 5 parts by weight of hexamethyldisilazane and 2.5 parts by weight of water were added, and the resulting mixture was then stirred for 1 hour without heating. The temperature was then raised to 150° C., and the mixing continued for a further 2 hours, before the temperature was once again cooled to room temperature. To 100 parts by weight of the thus obtained mixture were added: (b) 3.5 parts by weight of a dimethylpolysiloxane with a hydrogen atom bonded to a silicon atom at both terminals of the molecular chain (wherein the proportion of silicon atom bonded hydrogen atoms=0.13 weight %) and having a viscosity at 25° C. of 0.018 Pa·s, (c) 1.4 parts by weight of a methylhydrogenpolysiloxane with hydrogen atoms bonded to silicon atoms on side chains of the molecular chain (wherein the proportion of silicon atom bonded hydrogen atoms=0.38 weight %) and having a viscosity at 25° C. of 0.15 Pa·s, 5 parts by weight of a dimethylpolysiloxane with both terminals of the molecular chain blocked with a trimethylsilyl group and having a viscosity at 25° C. of approximately 100 Pa·s, sufficient quantity of a complex of chloroplatinic acid and divinyltetramethyldisiloxane to provide 30 ppm of platinum metal relative to the combined quantity of the aforementioned constituents (a), (b) and (c), and 0.1 parts by weight of 1,3,5,7-tetramethyl-1,3,5,7-tetravinylcyclotetrasiloxane as a retarding agent, and following careful stirring of the mixture, the mixture was degassed under vacuum to complete the production of the composition. This composition was then cured for 2 hours at 60° C., and used to prepare a sheet in accordance with JIS K 6249, and the general properties of the sheet were then measured. The mold durability was also evaluated in the same manner as described for the Example 1, and these results are shown in Table 1.

Example 3

A mixture of: (a) 65 parts by weight of a dimethylpolysiloxane with both terminals of the molecular chain blocked by a vinyldimethylsilyl group and having a viscosity at 25° C. of approximately 1 Pa·s, 20 parts by weight of hydrophobic silica with a specific surface area of 120 m²/g which had been treated with trimethylsilyl groups, and 35 parts by weight of powdered quartz with an average particle diameter of 5 μm was placed in a kneader, and with the mixture undergoing constant stirring, 5 parts by weight of hexamethyldisilazane and 2.5 parts by weight of water were added, and the resulting mixture was then stirred for 1 hour without heating. The temperature was then raised to 150° C., and the mixing continued for a further 2 hours, before the temperature was once again cooled to room temperature. To 100 parts by weight of the thus obtained mixture were added: (b) 6.9 parts by weight of a dimethylpolysiloxane with a hydrogen atom bonded to a silicon atom at both terminals of the molecular chain (wherein the proportion of silicon atom bonded hydrogen atoms=0.07 weight %) and having a viscosity at 25° C. of 0.04 Pa·s, (c) 1.3 parts by weight of a methylhydrogenpolysiloxane with hydrogen atoms bonded to silicon atoms on side chains of the molecular chain (wherein the proportion of silicon atom bonded hydrogen atoms=0.38 weight %) and having a viscosity at 25° C. of 0.15 Pa·s, sufficient quantity of a complex of chloroplatinic acid and divinyltetramethyldisiloxane to provide 30 ppm of platinum metal relative to the combined quantity of the aforementioned constituents (a), (b) and (c), and 0.1 parts by weight of 1,3,5,7-tetramethyl-1,3,5,7-tetravinylcyclotetrasiloxane as a retarding agent, and following careful stirring of the mixture, the mixture was degassed under vacuum to complete the production of the composition. This composition was then cured for 2 hours at 60° C., and used to prepare a sheet in accordance with JIS K 6249, and the general properties of the sheet were then measured.

Furthermore, the mold durability was also evaluated in the same manner as described for the Example 1, and these results are shown in Table 1.

Example 4

A mixture of: (a) 65 parts by weight of a dimethylpolysiloxane with both terminals of the molecular chain blocked by a vinyldimethylsilyl group and having a viscosity at 25° C. of approximately 1 Pa·s, 20 parts by weight of dried silica with a specific surface area of 200 m²/g, and 35 parts by weight of powdered quartz with an average particle diameter of 5 μm was placed in a kneader, and with the mixture undergoing constant stirring, 5 parts by weight of hexamethyldisilazane and 2.5 parts by weight of water were added, and the resulting mixture was then stirred for 1 hour without heating. The temperature was then raised to 150° C., and the mixing continued for a further 2 hours, before the temperature was once again cooled to room temperature. To 100 parts by weight of the thus obtained mixture were added: (b) 3.5 parts by weight of a dimethylpolysiloxane with a hydrogen atom bonded to a silicon atom at both terminals of the molecular chain (wherein the proportion of silicon atom bonded hydrogen atoms=0.13 weight %) and having a viscosity at 25° C. of 0.18 Pa·s, (c) 1.4 parts by weight of a methylhydrogenpolysiloxane with hydrogen atoms bonded to silicon atoms at a terminal of the molecular chain and on side chains of the molecular chain (wherein the proportion of silicon atom bonded hydrogen atoms=0.38 weight %) and having a viscosity at 25° C. of 0.15 Pa·s, 5 parts by weight of a dimethylpolysiloxane with both terminals of the molecular chain blocked with a trimethylsilyl group and having a viscosity at 25° C. of approximately 100 Pa·s, sufficient quantity of a complex of chloroplatinic acid and divinyltetramethyldisiloxane to provide 30 ppm of platinum metal relative to the combined quantity of the aforementioned constituents (a), (b) and (c), and 0.1 parts by weight of 1,3,5,7-tetramethyl-1,3,5,7-tetravinylcyclotetrasiloxane as a retarding agent, and following careful stirring of the mixture, the mixture was degassed under vacuum to complete the production of the composition. This composition was then cured for 2 hours at 60° C., and used to prepare a sheet in accordance with JIS K 6249, and the general properties of the sheet were then measured. The mold durability was also evaluated in the same manner as described for the Example 1, and these results are shown in Table 1.

Example 5

A mixture of: (a) 100 parts by weight of a dimethylpolysiloxane with both terminals of the molecular chain blocked by a vinyldimethylsilyl group and having a viscosity at 25° C. of approximately 1 Pa·s, 15 parts by weight of hydrophobic silica with a specific surface area of 120 m²/g which had been treated with trimethylsilyl groups, and 30 parts by weight of wet silica with a specific surface area of 200 m²/g was placed in a kneader, and with the mixture undergoing constant stirring, 5 parts by weight of hexamethyldisilazane and 2.5 parts by weight of water were added, and the resulting mixture was then stirred for 1 hour without heating. The temperature was then raised to 150° C., and the mixing continued for a further 2 hours, before the temperature was once again cooled to room temperature. To 100 parts by weight of the thus obtained mixture were added: (b) 4.5 parts by weight of a dimethylpolysiloxane with a hydrogen atom bonded to a silicon atom at both terminals of the molecular chain (wherein the proportion of silicon atom bonded hydrogen atoms=0.13 weight %) and having a viscosity at 25° C. of 0.018 Pa·s, (c) 1.5 parts by weight of a methylhydrogenpolysiloxane with hydrogen atoms bonded to silicon atoms on side chains of the molecular chain (wherein the proportion of silicon atom bonded hydrogen atoms=0.4 weight %) and having a viscosity at 25° C. of 0.01 Pa·s, sufficient quantity of a complex of chloroplatinic acid and divinyltetramethyldisiloxane to provide 30 ppm of platinum metal relative to the combined quantity of the aforementioned constituents (a), (b) and (c), and 0.1 parts by weight of 1,3,5,7-tetramethyl-1,3,5,7-tetravinylcyclotetrasiloxane as a retarding agent, and following careful stirring of the mixture, the mixture was degassed under vacuum to complete the production of the composition. This composition was then cured for 2 hours at 60° C., and used to prepare a sheet in accordance with JIS K 6249, and the general properties of the sheet were then measured. The mold durability was also evaluated in the same manner as described for the Example 1, and these results are shown in Table 1.

Example 6

A mixture of: (a) 93 parts by weight of a dimethylpolysiloxane with both terminals of the molecular chain blocked by a vinyldimethylsilyl group and having a viscosity at 25° C. of approximately 5 Pa·s, (a') 7 parts by weight of an organopolysiloxane resin comprising 39.5 mol % of $(CH_3)_3SiO_{1/2}$ units, 6.5 mol % of $(CH_3)_2(CH_2=CH)SiO_{1/2}$ units, and 54 mol % of $SiO_2$ units, and 25 parts by weight of hydrophobic silica with a specific surface area of 120 m²/g which had been treated with trimethylsilyl groups was placed in a kneader, and with the mixture undergoing constant stirring, 5 parts by weight of hexamethyldisilazane and 2.5 parts by weight of water were added, and the resulting mixture was then stirred for 1 hour without heating. The temperature was then raised to 150° C., and the mixing continued for a further 2 hours, before the temperature was once again cooled to room temperature. To 100 parts by weight of the thus obtained mixture were added: (b) 6 parts by weight of a dimethylpolysiloxane with a hydrogen atom bonded to a silicon atom at both terminals of the molecular chain (wherein the proportion of silicon atom bonded hydrogen atoms=0.13 weight %) and having a viscosity at 25° C. of 0.018 Pa·s, (c) 0.7 parts by weight of a methylhydrogenpolysiloxane with hydrogen atoms bonded to silicon atoms at a terminal of the molecular chain and on side chains of the molecular chain (wherein the proportion of silicon atom bonded hydrogen atoms=0.48 weight %) and having a viscosity at 25° C. of 0.012 Pa·s, sufficient quantity of a complex of chloroplatinic acid and divinyltetramethyldisiloxane to provide 30 ppm of platinum metal relative to the combined quantity of the aforementioned constituents (a), (a'), (b) and (c), and 0.1 parts by weight of 1,3,5,7-tetramethyl-1,3,5,7-tetravinylcyclotetrasiloxane as a retarding agent, and following careful stirring of the mixture, the mixture was degassed under vacuum to complete the production of the composition. This composition was then cured for 2 hours at 60° C., and used to prepare a sheet in accordance with JIS K 6249, and the general properties of the sheet were then measured. Furthermore, the mold durability for this composition was also evaluated in the same manner as described for the Example 1, and these results are shown in Table 1.

Comparative Example 1

A mixture of: (a) 65 parts by weight of a dimethylpolysiloxane with both terminals of the molecular chain blocked by a vinyldimethylsilyl group and having a viscosity at 25° C. of approximately 1 Pa·s, 20 parts by weight of hydrophobic silica with a specific surface area of 120 m²/g which had been treated with trimethylsilyl groups, and 15 parts by weight of powdered quartz with an average particle diameter of 5 μm was placed in a kneader, and with the mixture undergoing constant stirring, 5 parts by weight of hexamethyldisilazane and 2.5 parts by weight of water were added, and the resulting mixture was then stirred for 1 hour without heating. The temperature was then raised to 150° C., and the mixing continued for a further 2 hours, before the temperature was once again cooled to room temperature. To 100 parts by weight of the thus obtained mixture were added (b) 0.67 parts by weight of a dimethylpolysiloxane with a hydrogen atom bonded to a silicon atom at both terminals of the molecular chain (wherein the proportion of silicon atom bonded hydrogen atoms=0.26 weight %) and having a viscosity at 25° C. of 0.005 Pa·s, (c) 1.84 parts by weight of a methylhydrogenpolysiloxane with hydrogen atoms bonded to silicon atoms at a terminal of the molecular chain and on side chains of the molecular chain (wherein the proportion of silicon atom bonded hydrogen atoms=0.54 weight %) and having a viscosity at 25° C. of 0.012 Pa·s, 5 parts by weight of a dimethylpolysiloxane with both terminals of the molecular chain blocked with a trimethylsilyl group and having a viscosity at 25° C. of approximately 100 Pa·s, sufficient quantity of a complex of chloroplatinic acid and divinyltetramethyldisiloxane to provide 30 ppm of platinum metal relative to the combined quantity of the aforementioned constituents (a), (b) and (c), and 0.1 parts by weight of 1,3,5,7-tetramethyl-1,3,5,7-tetravinylcyclotetrasiloxane as a retarding agent, and following careful stirring of the mixture, the mixture was degassed under vacuum to complete the production of the composition. This composition was then cured for 2 hours at 60° C., and used to prepare a sheet in accordance with JIS K 6249, and the general properties of the sheet were then measured. Furthermore, the mold durability was also evaluated in the same manner as described for the Example 1, and these results are shown in Table 2.

Comparative Example 2

Using 100 parts by weight of a compound mixture prepared in the same manner as the Example 1 but without the addition of the powdered quartz with an average particle diameter of 5 μm, a composition was prepared according to the Example 1, with the exceptions of not adding the constituent (B), but adding 3.1 parts by weight of a methylhydrogenpolysiloxane with hydrogen atoms bonded to silicon atoms at a terminal of the molecular chain and on side chains of the molecular chain (wherein the proportion of silicon atom bonded hydrogen atoms=0.54 weight %) and having a viscosity at 25° C. of 0.012 Pa·s (12 mm²/s), and the thus prepared composition was cured and used to prepare a sheet, and the general properties of the sheet were then measured. Furthermore, the mold durability was also evaluated in the same manner as described for the Example 1, and these results are shown in Table 2.

TABLE 1

|  | Ex. 1 | Ex. 2 | Ex. 3 | Ex. 4 | Ex. 5 | Ex. 6 |
|---|---|---|---|---|---|---|
| Hardness (type A) | 35 | 38 | 40 | 38 | 25 | 20 |
| Elongation at shearing (%) | 480 | 470 | 450 | 460 | 600 | 850 |
| Tensile strength (MPa · s) | 5.4 | 5.3 | 4.9 | 5.3 | 7.0 | 5.0 |
| Tear strength (kN/m) | 17 | 22 | 22 | 21 | 25 | 10 |
| Rate of linear cross-linking (%)* | 37 | 46 | 49 | 46 | 49 | 70 |
| Mold release repetitions (times) | 65 | 70 | 70 | 70 | 75 | 65 |

*The ratio (mol %) of SiH groups in the constituent (B) relative to the total number of SiH groups in the combined constituent (B) and constituent (C)

TABLE 2

|  | Comp. EX 1 | Comp. EX. 2 |
|---|---|---|
| Hardness (type A) | 40 | 40 |
| Elongation at shearing (%) | 410 | 410 |
| Tensile strength (MPa · s) | 5.0 | 5.0 |
| Tear strength (kN/m) | 12 | 8 |
| Rate of linear cross-linking (%)* | 15 | — |
| Mold release repetitions (times) | 45 | 30 |

*The ratio (mol %) of SiH groups in the constituent (B) relative to the total number of SiH groups in the combined constituent (B) and constituent (C)

What is claimed is:

1. An organopolysiloxane composition for molding purposes comprising:
   (A) an organopolysiloxane with at least two alkenyl groups bonded to silicon atoms within a single molecule, having a viscosity at 25° C. of 0.05 to 100 Pa·s,
   (B) a straight chain organopolysiloxane with a hydrogen atom bonded to a silicon atom at both terminals and with no aliphatic unsaturated bonds within a molecule represented by a formula (I) shown below:

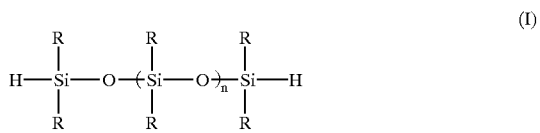

(I)

wherein, R is an unsubstituted or substituted monovalent hydrocarbon group with no alkenyl groups, and n is a number such that said organopolysiloxane has a viscosity at 25° C. of 0.001 to 1.0 Pa·s,
   (C) an organohydrogenpolysiloxane with at least three hydrogen atoms bonded to silicon atoms within a single molecule and comprising a RHSiO unit and a $R_2XSiO_{1/2}$ unit (wherein R is an unsubstituted or substituted monovalent hydrocarbon group with no alkenyl groups, and X represents a hydrogen atom or a group represented by R as defined above) within a molecule, having a viscosity at 25° C. of 0.001 to 1.0 Pa·s,
   (D) an effective quantity of a hydrosilylation reaction catalyst,
   (E) no more than 50 parts by weight of a finely powdered silica with a specific surface area of at least 50 m²/g, per 100 parts by weight of said constituent (A), and
   (F) 0 to 20 parts by weight of a non-functional organopolysiloxane having a viscosity at 25° C. of 0.01 to 500 Pa·s, per 100 parts by weight of said constituent (A),
   wherein a total number of hydrogen atoms bonded to silicon atoms within said constituent (B) and said constituent (C) is in a range of 1 to 5 atoms per alkenyl group within said constituent (A), and a number of hydrogen atoms bonded to silicon atoms within said constituent (B) accounts for 20 to 70 mol % of a combined number of hydrogen atoms bonded to silicon atoms within said constituent (B) and said constituent (C).

2. The composition according to claim 1, wherein said organopolysiloxane of said constituent (A) is a substantially straight chain diorganopolysiloxane in which the backbone chain comprises repeating diorganosiloxane units, and both terminals of said chain are blocked with a triorganosiloxy group.

3. The composition according to claim 1, wherein said organopolysiloxane of said constituent (A) has a viscosity at 25° C. of from 0.1 to 30 Pa·s.

4. The composition according to claim 1, wherein said groups R are, independently, a substituted or unsubstituted hydrocarbon group of 1 to 10 carbon atoms, selected from the group consisting of alkyl groups, cycloalkyl groups, aryl groups, aralkyl groups, and halogen-substituted alkyl groups.

5. The composition according to claim 1, wherein said organohydrogenpolysiloxane of said constituent (C) is represented by any one of the formulas shown below:

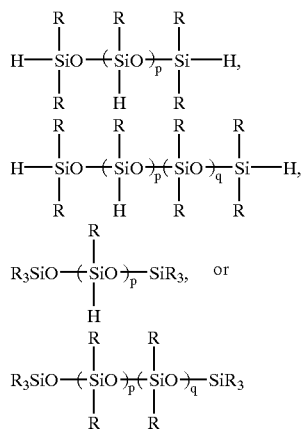

wherein, R represents an unsubstituted or substituted monovalent hydrocarbon group with no alkenyl groups, p and q each represent, independently, an integer of 1 or greater, and p and p+q are values which yield a viscosity at 25° C. for said organohydrogenpolysiloxane of 0.001 to 1.0 Pa·s.

6. The composition according to claim 1, wherein a total number of hydrogen atoms bonded to silicon atoms within said constituent (B) and said constituent (C) is in a range of 1 to 3 atoms per alkenyl group within said constituent (A).

7. The composition according to claim 1, wherein a number of hydrogen atoms bonded to silicon atoms within said constituent (B) accounts for 30 to 60 mol % of a combined number of hydrogen atoms bonded to silicon atoms within said constituent (B) and said constituent (C).

8. The composition according to claim 1, wherein said constituent (D) is a platinum based catalyst, a palladium-based catalyst or a rhodium based catalyst, and a quantity of said catalyst in terms of a weight of a metallic element is 0.01 to 500 ppm relative to a combined weight of said constituent (A), said constituent (B) and said constituent (C).

9. The composition according to claim 1, wherein said finely powdered silica of said constituent (E) is any one of dry process silica, wet silica, and either one of these which has undergone hydrophobic surface treatment.

* * * * *